(12) United States Patent
Witt

(10) Patent No.: US 6,445,859 B1
(45) Date of Patent: Sep. 3, 2002

(54) CENTRAL CAVITY CABLE WITH A PREDETERMINED GAP THAT FACILITATES OPENING OF THE OUTER SHEATH

(75) Inventor: Geoffrey M. Witt, Hickory, NC (US)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/739,678

(22) Filed: Dec. 20, 2000

(51) Int. Cl.[7] .................................................. G02B 6/44
(52) U.S. Cl. ........................................ 385/109; 385/110
(58) Field of Search ................................ 385/109–113

(56) References Cited

U.S. PATENT DOCUMENTS

| | | |
|---|---|---|
| 5,539,851 A | 7/1996 | Taylor et al. |
| 5,544,320 A | 8/1996 | Konrad |
| 5,627,932 A | 5/1997 | Kiel et al. |
| 5,649,041 A | 7/1997 | Clyburn, III et al. |
| 5,794,207 A | 8/1998 | Walker et al. |
| 5,796,901 A | 8/1998 | Stammer |
| 5,809,194 A | 9/1998 | Lovie |
| 5,838,864 A | 11/1998 | Patel et al. |
| 5,895,454 A | 4/1999 | Harrington |
| 5,905,834 A | 5/1999 | Anderson et al. |
| 5,912,977 A | 6/1999 | Barrett |
| 5,960,411 A | 9/1999 | Hartman et al. |
| 5,982,965 A * | 11/1999 | Cheron et al. ........... 385/109 X |
| 6,249,629 B1 * | 6/2001 | Bringuier ..................... 385/113 |
| 6,256,438 B1 * | 7/2001 | Gimblet ....................... 385/109 |

* cited by examiner

Primary Examiner—Brian Sircus
Assistant Examiner—Son V. Nguyen
(74) Attorney, Agent, or Firm—Sughrue Mion, PLLC

(57) ABSTRACT

A cable includes a flexible, cut resistant tape provided around an optical wave guide. The optical wave guide may include a bare optical fiber and/or a soft buffer tube in which an optical fiber is provided. The tape and optical wave guide are provided in an outer sheath with a central cavity. The central cavity is sized to accommodate a predetermined gap between (1) the outer sheath and (2) the tape and the optical wave guide.

12 Claims, 3 Drawing Sheets

CENTRAL CAVITY CABLE WITH A PREDETERMINED GAP THAT FACILITATES OPENING OF THE OUTER SHEATH

FIELD OF THE INVENTION

The present invention relates in general to optical cables, and more particularly to an optical cable having a central cavity that provides a predetermined gap between (1) an inner diameter of an outer sheath and (2) an outer diameter of the contents within the cable's central cavity. The gap prevents optical wave guides within the central cavity from being damaged upon opening the outer sheath.

BACKGROUND

Central cavity cables are known in which optical fibers (or soft buffer tubes containing optical fibers) are provided in a core tube that extends along the axis of the cable. An outer sheath, which may or may not include armoring, surrounds the core tube. Although core tube cable designs are generally thought to be acceptable, they are not without shortcomings. The shortcomings are most apparent when considering conventional, cable opening techniques. A cable may need to be opened, for example, to perform optical fiber splicing.

Cable opening involves penetrating through the outer sheath and the core tube in order to gain access to the optical fibers and soft buffer tubes. Two primary techniques are employed for removing the outer sheath. In the first technique, a user pulls on a ripcord that is interposed between the core tube and the outer sheath. When pulled with enough force, the ripcord cuts through the outer sheath. In the second technique, a user manipulates a cutting tool to penetrate through the outer sheath and partially into the core tube. That is, the cutting tool penetrates past the outer sheath's inner diameter and partially into the wall thickness of the core tube. Once the outer sheath is removed, the core tube is then opened to gain access to the central cavity in which the optical fibers and soft buffer tubes are provided.

In both sheath removal techniques, the core tube shield's the optical fibers from the ripcord and/or the cutting tool. That is, the core tube prevents the ripcord from passing through to the interior of the central cavity, and/or provides a cutting depth margin for the cutting tool. A special tool must be used to open the core tube, which is different from the cutting tool used to cut the sheath. Accordingly, gaining access to the cable's central cavity is cumbersome and time consuming.

Moreover, some new cable designs do not include a core tube. These new designs are limited, however, because they remain difficult to open. For example, if the ripcord technique were employed, both the ripcord and the optical fibers would occupy the central cavity. When pulled, therefore, the ripcord could pass through the central cavity and damage the optical fibers. Similarly, if the cutting tool technique were employed, there would be no cutting depth margin to prevent/avoid optical fiber damage.

It is therefore an object of this invention to provide a cable having a predetermined gap that (1) protects the fibers and soft buffer tubes during tool access, (2) eliminates the need for a rigid core tube, and (3) improves the accessibility of the optical fibers.

SUMMARY OF THE INVENTION

The invention resides in a cable having an optical wave guide and a tape provided around the optical wave guide. The optical wave guide and the tape are provided in a central cavity of an outer sheath. The central cavity is sized to accommodate a predetermined gap between (1) the outer sheath and (2) the tape and the optical wave guide. During a cable opening process, the predetermined gap forms a void that serves as a cutting tool depth buffer. Preferably, the predetermined gap is at least 2.0 mm and more preferably at least 0.25 mm.

The above and other features of the invention including various and novel details of construction will now be more particularly described with reference to the accompanying drawings and pointed out in the claims. It will be understood that the particular cable embodying the invention is shown by way of illustration only and not as a limitation of the invention. The principles and features of this invention may be employed in varied and numerous embodiments without departing from the scope of the invention.

DETAILED DESCRIPTION OF THE INVENTION

Figure 1:
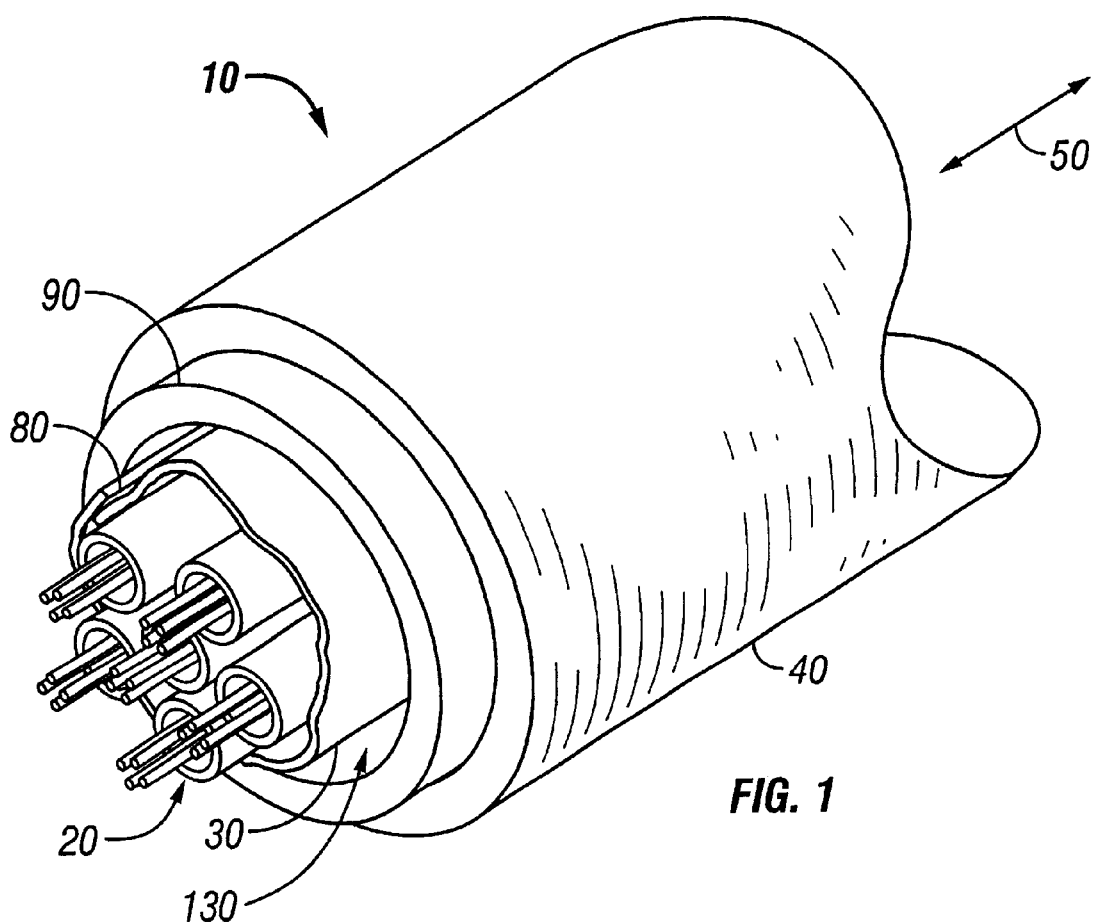
FIG. 1 is a perspective view of a cable according to an embodiment of the present invention.

FIG. 1 shows a cable 10 according to an embodiment of the present invention. The cable 10 has an outer sheath 40, which may or may not include an armoring 90. The outer sheath 40 defines a central cavity 130 along a longitudinal axis 50 of the cable 10. The central cavity 130 accommodates optical wave guides 20. The optical wave guides 20 are surrounded by a tape 30. The optical wave guides 20 and the tape 30 extend loosely through the central cavity 130.

Figure 2:
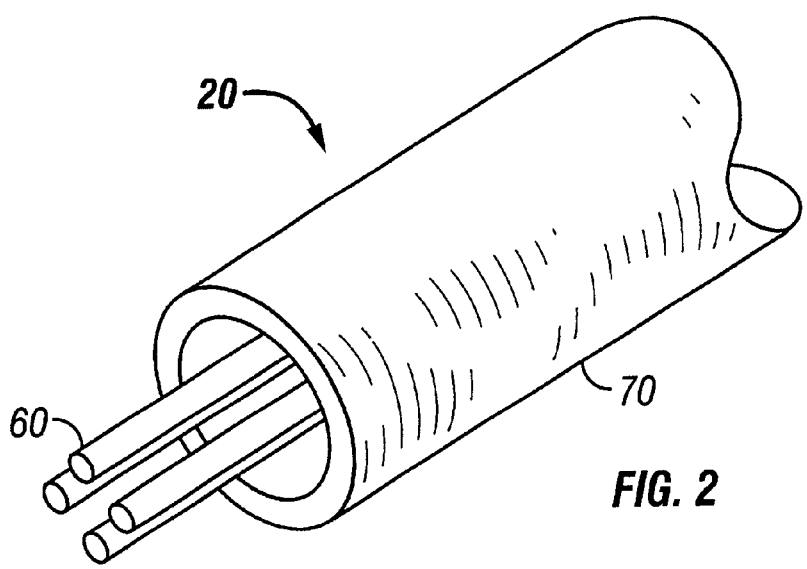
FIG. 2 is a perspective view of an optical wave guide provided in the cable shown in FIG. 1.

Turning briefly to FIG. 2, the optical wave guides 20 include soft buffer tubes 70 in which optical fibers 60 are provided. Alternatively, the optical wave guides 20 may include bare optical fibers 60 (without the soft buffer tubes 70). Such optical wave guides 20 are well known in this art, and therefore a detailed description of the same is not provided.

Figure 3A:
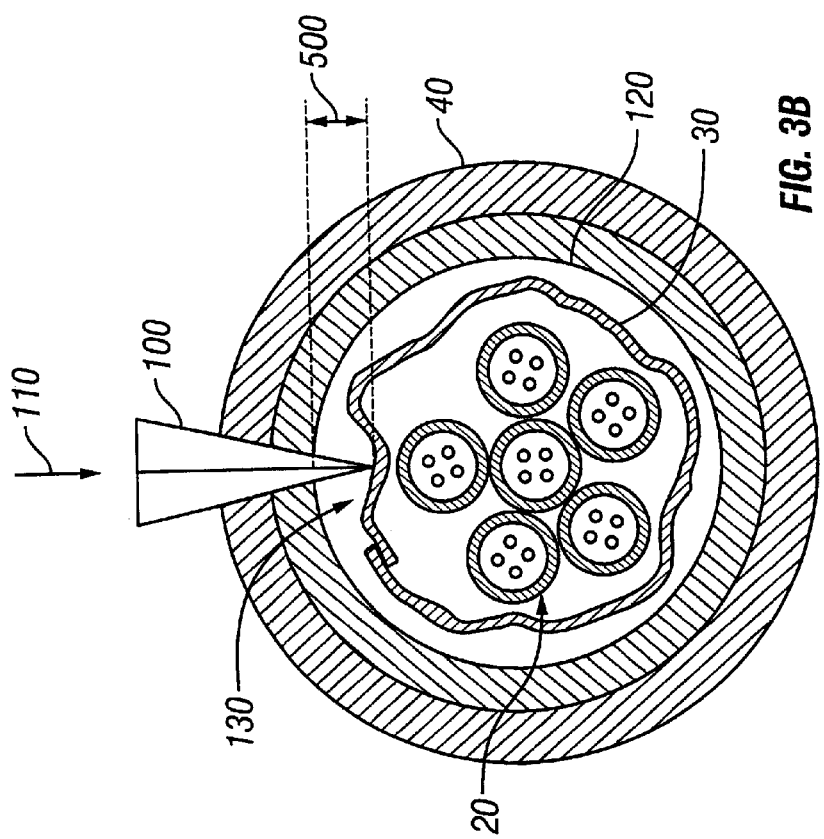
FIG. 3(a) is a cross sectional view taken transverse to the longitudinal axis of the cable shown in FIG. 1, before being cut by a tool.

In FIG. 3(a), the cable 10 is shown in a "pre-cut" state. That is, FIG. 3(a) shows the normal or expected positional relationships among the cable elements. Since the optical wave guides 20 and the tape 30 are loosely provided in the central cavity 130, the optical wave guides 20 may occupy any available space within the tape 30, and the tape 30 may occupy any available space around the optical wave guides 20. Moreover, it will be appreciated that the positional relationships among the cable elements within the central cavity 130 may vary along the longitudinal axis 50 of the cable. FIG. 3(a) also shows a cutting tool 100 positioned above the cable 10.

During the cable opening process, the cutting tool 100 moves in a cutting direction 110 and cuts through the outer sheath 40 and the armoring 90, to thereby gain access to the cable elements within the central cavity 130. Ideally, the cutting tool 100 would penetrate through the outer sheath 40 and the armoring 90, but not into the central cavity 130. That is, the cutting tool would cut through and stop precisely at the outer sheath's inner diameter 120. In this ideal situation, the optical wave guides 20 could not possibly be damaged by the cutting tool 100, because the cutting tool 100 does not enter into the central cavity 130.

Many factors render the ideal situation a practical impossibility. The factors include tolerances in the cutting tool 100, tolerances in the cable elements, and the specific cable design. Consider, for example, a variation in the wall thickness of the outer sheath 40. In a thicker portion, the cutting tool 100 would not cut all the way through the outer sheath 40. And in a thinner portion, the cutting tool 100 would penetrate into the central cavity 130, thereby exposing the optical wave guides 20 to the risk of damage from the cutting tool 100. Such tolerances, which are an unavoidable part of cable manufacture and cutting tool manufacture, necessarily prevent the ideal situation from being achieved. In fact, these tolerances become particularly problematic when attempting cut the cable along its longitudinal axis 50.

In order to compensate for the problematic factors noted above, and with reference to FIG. 3(b), the central cavity 130 is designed to accommodate a predetermined gap 500 between the outer sheath 40 and the cable elements that reside within the central cavity 130. During a cable opening process, the predetermined gap 500 forms a void that advantageously serves as a cutting tool 100 depth buffer, which protects the optical wave guides 20 from the cutting tool 100. That is, as the cutting tool 100 penetrates completely through the outer sheath 40 and into the inner cavity 130, it pushes the tape 30 (and the cable elements within the tape 30) away from the outer sheath's inner diameter 120.

Competing cable design goals determine the size of the gap 500. On one hand, the size of the gap 500 must be large enough to allow for movement of the tape 30 and optical wave guides 20 in the cutting direction 110 within the central cavity 130. On the other hand, it is desirable to have a small gap 500, so that the majority of space within the central cavity 130 may be used to accommodate cable elements. The smaller the gap 500, the higher the cable efficiency (i.e., more optical wave guides 20 per cable volume). The minimum acceptable size of the gap 500 is determined by several considerations in worst case scenario. Specifically, the size of the gap 500 may be minimized by solving he following equation:

(1) the inner diameter 120 of the outer sheath 40; minus (2) the outer diameter of a circular-shaped bundle of the cable elements within the central cavity 130 (excluding the tape 30), plus two times the thickness of the tape 30.

Figure 3B:
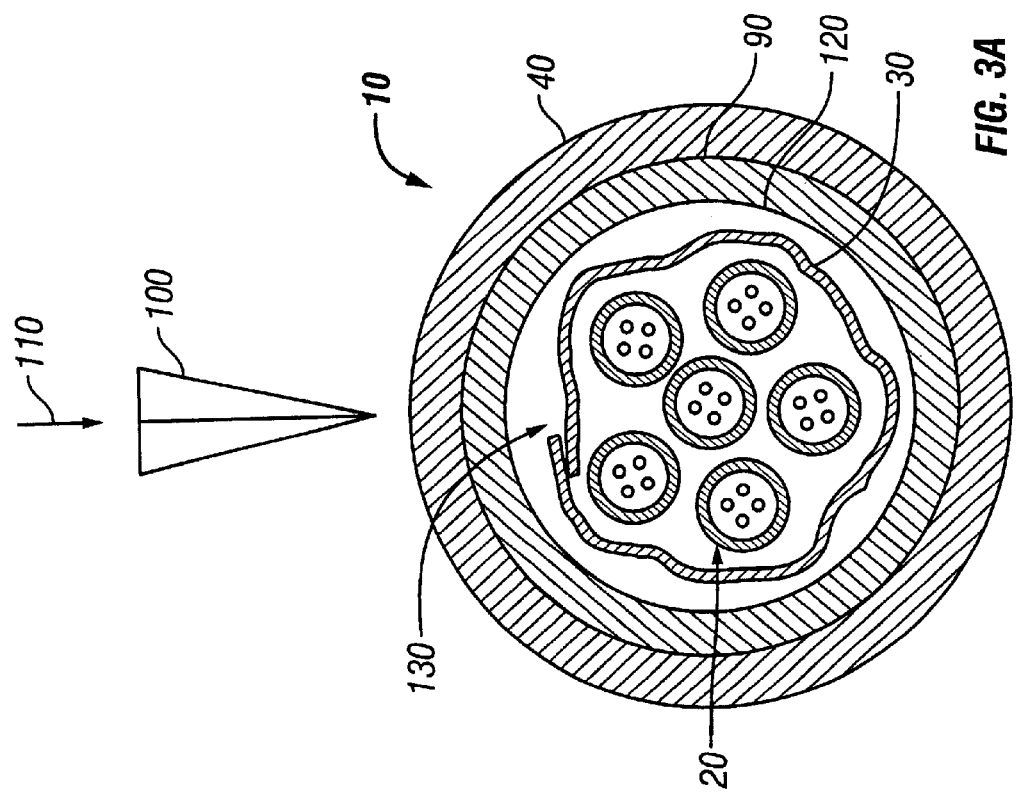
FIG. 3(b) is a cross sectional view taken transverse to the longitudinal axis of the cable shown in FIG. 1, after being cut by a tool.

This equation will be appreciated with reference to FIG. 3(b), which depicts a worst case scenario. The optical wave guides 20 are considered as a circular-shaped bundle in which they are packed together as efficiently as possible, without any deformation. This type of bundle could be presented in the field, for example, if the optical wave guides 20 were helically wound, and if a cut were made along the cable's longitudinal axis 50. As the cutting tool 100 progresses along the cable's longitudinal axis (perpendicular to the drawing sheet), the helix could become compressed. In the compressed state, the bundle would take on a circular shape. Accordingly, in this worst case scenario, the cutting tool 100 would pass across the compressed, circular-shaped bundle.

The calculation noted above also takes into consideration two times the thickness of the tape 30. This consideration is necessary because the tape 30 passes between the cutting tool 100 and the circular-shaped bundle (at the top of FIG. 3(b)), and passes between the circular shaped bundle and the outer sheath 40 (at the bottom of FIG. 3(b)).

Preferably, the predetermined gap is at least 2.0 mm, and more preferably at least 0.25 mm.

Figure 4:
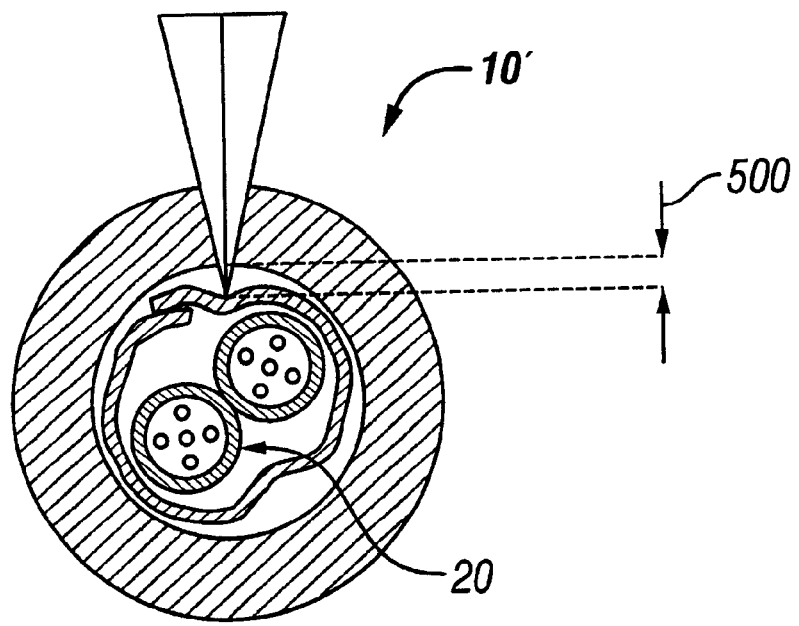
FIG. 4 is a transverse cross sectional view of a cable according to a second embodiment of the present invention having two optical wave guides.
Figure 5:
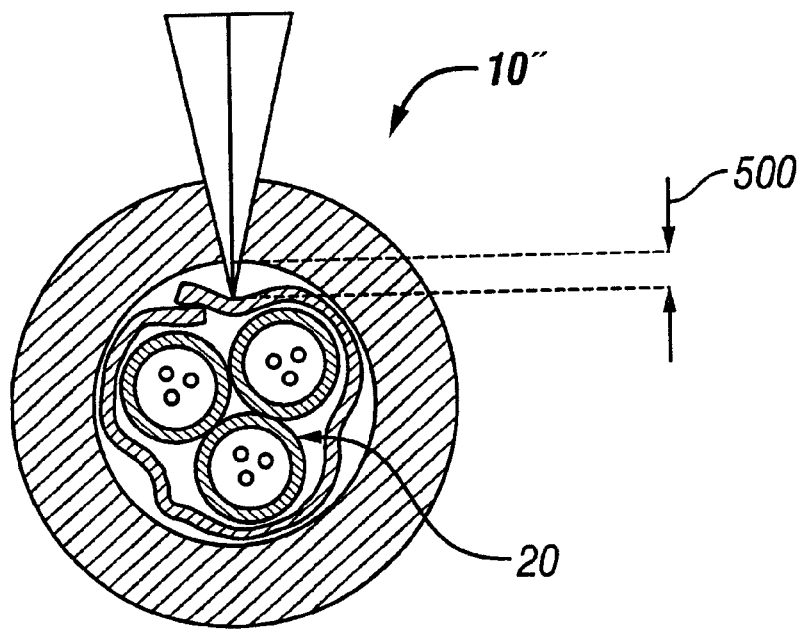
FIG. 5 is a transverse cross sectional view of a cable according to a third embodiment of the present invention having three optical wave guides.

FIGS. 4 and 5 show embodiments of the invention similar to FIGS. 3(b), however, he number of optical wave guides 20 is varied to provide additional illustrations on minimizing the size of the gap 500. In FIG. 4, the cable 10' has two optical wave guides 20. The worst case scenario is shown in which the two optical wave guides 20 are shown in a circular-shaped bundle. In FIG. 5, the cable 10" has three optical wave guides 20. The worst case scenario is shown in which the three optical wave guides 20 are shown in the circular-shaped bundle.

The tape 30 is an important aspect of the invention because it shields the optical wave guides 20 from the cutting tool 100. To this end, the tape 30 has two characteristics: cut resistance; and flexibility. These two characteristics may vary from one application to the next depending on many factors, such as the cable design, the installed environment, the size of the cable elements, the cutting tool 100, and the size of the gap 500. Due to the tape's cut resistance and flexibility, during a cable opening process, the cutting tool 100 slides along the outside of the tape 30, without penetrating through the tape 30. In this way, the tape 30 protects the optical wave guides 20, which are relatively delicate by comparison.

The tape 30 may be fabricated from a wide variety of materials, so long as the tape 30 is flexible and cut resistant. Such materials may include, for example, MYLAR and woven textiles. Many well known materials provide suitable characteristics, and therefore a more detailed list of materials is not provided.

In a preferred embodiment, the tape 30 provides a water swellable characteristic. For example, the tape 30 may be impregnated or coated with a powder that swells when wetted. The swelled powder serves to block the central cavity 130, thereby preventing the central cavity from becoming a conduit for a fluid that has penetrated the outer sheath 40. Water swellable powders are well known in this art and therefore a further description is not provided.

Preferably, as shown in FIG. 1, the tape 30 wraps around the optical wave guides 20, without lay. That is, as shown in FIG. 1, two edges of the tape 30 overlap to form a seam 80 that extends substantially in the direction of the longitudinal axis 50. The tape 30 may also wrap around the optical wave guides 20 with lay, i.e., in a helical fashion.

As shown in FIG. 1, the armoring 90 is positioned near the center of the sheath's wall thickness. However, the armoring 90 may be positioned inwardly or outwardly from the position shown in FIG. 1. Also, the armoring 90 has a tubular shape. The shape, however, may vary depending on the particular application. For example, the armoring 90 may include a plurality of strands that extend in the direction of the longitudinal axis 50. Moreover, in some applications, the armoring 90 may be altogether omitted.

A cable design according to the present -invention provides many advantages in terms of manufacture and opening capabilities. Namely, the cable has low manufacture costs. Furthermore, the cable 10 may be opened quickly and reliably, i.e., without damaging the delicate optical wave guides 20 that reside in the central cavity 130.

What is claimed is:

1. A cable comprising:

an optical wave guide;

a tape provided around said optical wave guide; and an outer sheath with a central cavity in which said tape and said optical wave guide are provided;

wherein said central cavity is sized to accommodate a predetermined gap between said outer sheath and said tape provided around said optical wave guide, such that during a cable opening process, said tape and said optical wave guide are moveable within said central cavity so that a cutting tool penetrating through said outer sheath and into said central cavity will not cut said tape.

2. The cable according to claim 1, wherein said optical wave guide is an optical fiber.

3. The cable according to claim 2, wherein said optical wave guide includes a plurality of optical fibers.

4. The cable according to claim 1, wherein said optical wave guide is an optical fiber provided in a buffer tube.

5. The cable according to claim 4, further including:

a plurality of buffer tubes; and at least one fiber provided in each of said buffer tubes.

6. The cable according to claim 1, wherein said tape is wrapped, without lay, around said optical wave guide.

7. The cable according to claim 1, wherein said tape has two edges that are overlapped to form a longitudinal seam.

8. The cable according to claim 1, further comprising:

an armor disposed in said outer sheath.

9. The cable according to claim 1, wherein said tape is a water swellable tape.

10. The cable according to claim 9, wherein said water swellable tape further comprises:

a ribbon that is one of impregnated and coated with a water swellable powder.

11. The cable according to claim 1, wherein said predetermined gap is at least 0.25 mm.

12. The cable according to claim 3, wherein all of said plurality of optical fibers in said central cavity are enclosed by said tape.

* * * * *